United States Patent
Hohmann, Jr.

(10) Patent No.: US 8,037,653 B2
(45) Date of Patent: Oct. 18, 2011

(54) DUAL SEAL ANCHORING SYSTEMS FOR INSULATED CAVITY WALLS

(75) Inventor: Ronald P. Hohmann, Jr., Hauppauge, NY (US)

(73) Assignee: Mitek Holdings, Inc., Wilmington, DE (US)

(*) Notice: Subject to any disclaimer, the term of this patent is extended or adjusted under 35 U.S.C. 154(b) by 372 days.

(21) Appl. No.: 11/640,151

(22) Filed: Dec. 14, 2006

(65) Prior Publication Data

US 2008/0141605 A1     Jun. 19, 2008

(51) Int. Cl.
*E04B 1/41* (2006.01)
*E04C 5/12* (2006.01)

(52) U.S. Cl. ............................ 52/379; 52/513
(58) Field of Classification Search .................. 52/379, 52/513, 408; 411/400, 401, 424
See application file for complete search history.

(56) References Cited

U.S. PATENT DOCUMENTS

| | | |
|---|---|---|
| 2,058,148 A | 10/1936 | Hard |
| 2,130,531 A * | 9/1938 | Arand ........................ 52/506.09 |
| 2,966,705 A | 1/1961 | Massey |
| 3,377,764 A | 4/1968 | Storch |
| 3,786,605 A | 1/1974 | Winfrey |
| 4,021,990 A | 5/1977 | Schwalberg |
| 4,305,239 A | 12/1981 | Geraghty |
| 4,373,314 A | 2/1983 | Allan |
| 4,438,611 A | 3/1984 | Bryant |
| 4,473,984 A * | 10/1984 | Lopez ............................. 52/410 |
| 4,596,102 A | 6/1986 | Catani et al. |
| 4,598,518 A | 7/1986 | Hohmann |
| 4,600,344 A | 7/1986 | Sutenbach et al. |
| 4,764,069 A * | 8/1988 | Reinwall et al. .............. 411/397 |
| 4,869,038 A | 9/1989 | Catani |
| 4,869,043 A | 9/1989 | Hatzinikolas et al. |
| 4,875,319 A | 10/1989 | Hohmann |
| 5,012,624 A | 5/1991 | Dahlgren |
| 5,207,043 A | 5/1993 | McGee et al. |
| 5,392,581 A | 2/1995 | Hatzinikolas et al. |
| 5,408,798 A | 4/1995 | Hohmann |

(Continued)

OTHER PUBLICATIONS

ASTM WK 2748, Leakage Air Barrier Assemblies, Jan. 2005.

(Continued)

*Primary Examiner* — Dalena Tran
*Assistant Examiner* — Jason Holloway
(74) *Attorney, Agent, or Firm* — Siegmar Silber, Esq.

(57) ABSTRACT

An anchoring system for cavity walls is disclosed. The system includes a stud-type wall anchor and a wire formative veneer tie. The stud has a driver head, a dual-diameter barrel, and a driven tip. A flange at the juncture of the two barrels houses an interior seal; and a flange under the driver head, an exterior seal. The smaller diameter barrel is coextensive with the drywall installation; and the length of the larger diameter barrel, with the rigid insulation. The interior seal seals the insertion point into the drywall installation; and the exterior seal, the opening of the anchor-receiving channel. The interior seal and the larger barrel of the anchor fill the anchor-receiving channel and stabilize the wall anchor. Also, the wall anchor is clamped in place by the seals. The stud-type anchor operates with a variety of veneer ties for different applications.

10 Claims, 6 Drawing Sheets

U.S. PATENT DOCUMENTS

| | | | |
|---|---|---|---|
| 5,439,338 A | | 8/1995 | Rosenberg |
| 5,454,200 A | * | 10/1995 | Hohmann ........................ 52/513 |
| 5,456,052 A | | 10/1995 | Anderson et al. |
| 5,634,310 A | * | 6/1997 | Hohmann ........................ 52/513 |
| 5,644,889 A | * | 7/1997 | Getz ............................... 52/713 |
| 5,816,008 A | | 10/1998 | Hohmann |
| 6,209,281 B1 | | 4/2001 | Rice |
| 6,279,283 B1 | | 8/2001 | Hohmann et al. |
| 6,345,472 B1 | * | 2/2002 | Taylor ........................... 52/125.4 |
| 6,941,717 B2 | | 9/2005 | Hohmann et al. |
| 7,334,374 B2 | * | 2/2008 | Schmid ........................... 52/361 |
| 7,415,803 B2 | | 8/2008 | Bronner |
| 7,421,826 B2 | * | 9/2008 | Collins et al. ................. 52/302.1 |
| 2002/0100239 A1 | * | 8/2002 | Lopez ............................ 52/379 |
| 2004/0003558 A1 | * | 1/2004 | Collins et al. ................. 52/302.1 |
| 2004/0216416 A1 | * | 11/2004 | Hohmann et al. .............. 52/513 |
| 2005/0279042 A1 | * | 12/2005 | Bronner ........................ 52/513 |
| 2005/0279043 A1 | | 12/2005 | Bronner |
| 2010/0037552 A1 | | 2/2010 | Bronner |

OTHER PUBLICATIONS

Building Envelope Requirements, 780 CMR§1304.3 of Chapter 13; Boston, MA, Jan. 1, 2001.

Wire Bond Corp; "Wire-Bond Sure Tie" and "Wire-Bond Clip". Product Catalog Sheet (Charlotte, NC, undated).

Heckmann Building Products, Inc. Pos-I-Tie Air Infiltration and Water Penetration Test, Aug. 2003. http://www.heckman-nbuildingprods.com/PPosTest.htm.

Heckmann Building Products, Inc. "Wing Nut Pos-I-Tie." Product Catalogue Sheet. (Melrose Park, IL, undated).

Building Envelope Requirements, 780 CMR sec. 1304.3 of chapter 13, Boston, MA, Jan. 1, 2001.

Wire Bond Corp; "Wire-Bond Sure Tie" and "Wire-Bond Clip." Product Catalog Sheet(Charlotte, NC, undated).

Heckmann Building Products, Inc. Pos-I-Tie Air Infiltration and Water Penetration Test, Aug. 2003. http://www.heckman-nbuildingprods.com/PPosTest.htm.

* cited by examiner

DUAL SEAL ANCHORING SYSTEMS FOR INSULATED CAVITY WALLS

BACKGROUND OF THE INVENTION

1. Field of the Invention

This invention relates to anchoring systems for insulated cavity walls. At the inner wythe, the anchoring systems provide sealing along the dual-diameter barrel of the wall anchor with a first seal covering the insertion site at the air/vapor barrier and a second seal covering the opening of the wall anchor channel at the exterior surface of the insulation. At the outer wythe, the anchoring systems provide a variety of veneer ties for angular adjustment, self-leveling, and seismic protection. Besides sealing the air-vapor barrier and the insulation, the seals provide support for the wall anchor and substantially preclude lateral movement.

2. Description of the Prior Art

In the past, anchoring systems have taken a variety of configurations. Where the applications included masonry backup walls, wall anchors were commonly incorporated into ladder—or truss-type reinforcements and provided wire-to-wire connections with box ties or pintle-receiving designs on the veneer side.

In the late 1980's, surface-mounted wall anchors were developed by Hohmann & Barnard, Inc., patented under U.S. Pat. No. 4,598,518 ('518) of the first-named inventor hereof. The invention was commercialized under trademarks DW-10®, DW-10-X®, and DW-10-HS®. These widely accepted building specialty products were designed primarily for drywall construction, but were also used with masonry backup walls. For seismic applications, it was common practice to use these wall anchor as part of the DW-10 Seismiclip® interlock system which added a Byna-Tie® wire formative, a Seismiclip® snap-in device—described in U.S. Pat. No. 4,875,319 ('319), and a continuous wire reinforcement.

In the dry wall application, the surface-mounted wall anchor of the above-described system has pronged legs that pierce the insulation and the wall board and rest against the metal stud to provide mechanical stability in a four-point landing arrangement. The vertical slot of the wall anchor enables the mason to have the wire tie adjustably positioned along a pathway of up to 3.625-inch (max). The interlock system served well and received high scores in testing and engineering evaluations which examined the effects of various forces, particularly lateral forces, upon brick veneer masonry construction. However, under certain conditions, the system did not sufficiently maintain the integrity of the insulation.

The engineering evaluations further described the advantages of having a continuous wire embedded in the mortar joint of anchored veneer wythes. The seismic aspects of these investigations were reported in the inventor's '319 patent. Besides earthquake protection, the failure of several high-rise buildings to withstand wind and other lateral forces resulted in the incorporation of a continuous wire reinforcement requirement in the Uniform Building Code provisions. The use of a continuous wire in masonry veneer walls has also been found to provide protection against problems arising from thermal expansion and contraction and to improve the uniformity of the distribution of lateral forces in the structure.

Shortly after the introduction of the pronged wall anchor, a seismic veneer anchor, which incorporated an L-shaped backplate, was introduced. This was formed from either 12- or 14-gauge sheetmetal and provided horizontally disposed openings in the arms thereof for pintle legs of the veneer anchor. In general, the pintle-receiving sheetmetal version of the Seismiclip® interlock system served well, but in addition to the insulation integrity problem, installations were hampered by mortar buildup interfering with pintle leg insertion.

In the 1980's, an anchor for masonry veneer walls was developed and described in U.S. Pat. No. 4,764,069 by Reinwall et al., which patent is an improvement of the masonry veneer anchor of Lopez, U.S. Pat. No. 4,473,984. Here the anchors are keyed to elements that are installed using power-rotated drivers to deposit a mounting stud in a cementitious or masonry backup wall. Fittings are then attached to the stud which include an elongated eye and a sire tie therethrough for deposition in a bed joint of the outer wythe. It is instructive to note that pin-point loading—that is forces concentrated at substantially a single point—developed from this design configuration. Upon experiencing lateral forces over time, this resulted in the loosening of the stud.

Exemplary of the public sector building specification is that of the Energy Code Requirement, Boston, Mass. (See Chapter 13 of 780 CMR, Seventh Edition). This Code sets forth insulation R—values well in excess of prior editions and evokes an engineering response opting for thicker insulation and correspondingly larger cavities.

As insulation became thicker, the tearing of insulation during installation of the pronged DW-10X wall anchor, see supra, became more prevalent. This occurred as the installer would fully insert one side of the wall anchor before seating the other side. The tearing would occur during the arcuate path of the insertion of the second leg. The gapping caused in the insulation permitted air and moisture to infiltrate through the insulation along the pathway formed by the tear. While the gapping was largely resolved by placing a self-sealing, dual-barrier polymeric membrane at the site of the legs and the mounting hardware, with increasing thickness in insulation, this patchwork became less desirable. The improvements hereinbelow in surface mounted wall anchors look toward greater retention of insulation integrity and less reliance on a patch.

Another prior art development occurred shortly after that of Reinwall/Lopez when Hatzinikolas and Pacholok of Fero Holding Ltd. Introduced their sheetmetal masonry connector for a cavity wall. This device is described in U.S. Pat. Nos. 5,392,581 and 4,869,043. Here a sheetmetal plate connects to the side of a dry wall column and protrudes through the insulation into the cavity. A wire tie is threaded through a slot in the leading edge of the plate capturing an insulative plate thereunder and extending into a bed joint of the veneer. The underlying sheetmetal plate is highly thermally conductive, and the '581 patent describes lowering the thermal conductivity by foraminously structuring the plate. However, as there is no thermal break, a concomitant loss of the insulative integrity results.

In recent building codes for masonry structures a trend away from eye and pintle structures is seen in that newer codes require adjustable anchors be detailed to prevent disengagement. This has led to anchoring systems in which the open end of the veneer tie is embedded in the corresponding bed joint of the veneer and precludes disengagement by vertical displacement.

In the past, the use of wire formatives have been limited by the mortar layer thickness which, in turn are dictated either by the new building specifications or by pre-existing conditions, e.g. matching during renovations or additions the existing mortar layer thickness. While arguments have been made for increasing the number of the fine-wire anchors per unit area of the facing layer, architects and architectural engineers have favored wire formative anchors of sturdier wire.

Contractors found that heavy wire anchors, with diameters approaching the mortar layer height specification, frequently result in misalignment. This led to the low-profile wall anchors of the inventors hereof as described in U.S. Pat. No. 6,279,283. However, the above-described technology did not fully address the adaption thereof to insulated inner wythes utilizing stabilized stud-type devices.

In the course of prosecution of U.S. Pat. No. 4,598,518 (Hohmann '518) several patents indicated by an asterisk on the tabulation below, became known to the inventors hereof and are acknowledged hereby. Thereafter and in preparing for this disclosure, the additional patents which became known to the inventors are discussed further as to the significance thereof:

| Patent | Inventor | O.Cl. | Issue Date |
| --- | --- | --- | --- |
| 2,058,148* | Hard | 52/714 | October, 1936 |
| 2,966,705* | Massey | 52/714 | January, 1961 |
| 3,377,764 | Storch | | Apr. 16, 1968 |
| 4,021,990* | Schwalberg | 52/714 | May 10, 1977 |
| 4,305,239* | Geraghty | 52/713 | December, 1981 |
| 4,373,314 | Allan | | Feb. 14, 1983 |
| 4,438,611* | Bryant | 52/410 | March, 1984 |
| 4,473,984 | Lopez | | Oct. 2, 1984 |
| 4,598,518 | Hohmann | | Jul. 8, 1986 |
| 4,869,038 | Catani | | Sep. 26, 1989 |
| 4,875,319 | Hohmann | | Oct. 24, 1989 |
| 5,392,581 | Hatzinikolas et al. | | Feb. 28, 1995 |
| 5,408,798 | Hohmann | | Apr. 25, 1995 |
| 5,456,052 | Anderson et al. | | Oct. 10, 1995 |
| 5,816,008 | Hohmann | | Oct. 15, 1998 |
| 6,209,281 | Rice | | Apr. 3, 2001 |
| 6,279,283 | Hohmann et al. | | Aug. 28, 2001 |
| FOREIGN PATENT DOCUMENTS | | | |
| Patent | Country | O.Cl. | Issue Date |
| 279209* | CH | 52/714 | March, 1952 |
| 2069024* | GB | 52/714 | August, 1981 |

Note: Original classification provided for asterisked items only.

It is noted that with some exceptions these devices are generally descriptive of wire-to-wire anchors and wall ties and have various cooperative functional relationships with straight wire runs embedded in the inner and/or outer wythe.

U.S. Pat. No. 3,377,764—D. Storch—Issued Apr. 16, 1968 discloses a bent wire, tie-type anchor for embedment in a facing exterior wythe engaging with a loop attached to a straight wire run in a backup interior wythe.

U.S. Pat. No. 4,021,990—B. J. Schwalberg—Issued May 10, 1977 discloses a dry wall construction system for anchoring a facing veneer to wallboard/metal stud construction with a pronged sheetmetal anchor. Like Storch '764, the wall tie is embedded in the exterior wythe and is not attached to a straight wire run.

U.S. Pat. No. 4,373,314—J. A. Allan—Issued Feb. 15, 1983 discloses a vertical angle iron with one leg adapted for attachment to a stud; and the other having elongated slots to accommodate wall ties. Insulation is applied between projecting vertical legs of adjacent angle irons with slots being spaced away from the stud to avoid the insulation.

U.S. Pat. No. 4,473,984—Lopez—Issued Oct. 2, 1984 discloses a curtain-wall masonry anchor system wherein a wall tie is attached to the inner wythe by a self-tapping screw to a metal stud and to the outer wythe by embedment in a corresponding bed joint. The stud is applied through a hole cut into the insulation.

U.S. Pat. No. 4,869,038—M. J. Catani—Issued Sep. 26, 1989 discloses a veneer wall anchor system having in the interior wythe a truss-type anchor, similar to Hala et al. '226, supra, but with horizontal sheetmetal extensions. The extensions are interlocked with bent wire pintle-type wall ties that are embedded within the exterior wythe.

U.S. Pat. No. 4,879,319—R. Hohmann—Issued Oct. 24, 1989 discloses a seismic construction system for anchoring a facing veneer to wallboard/metal stud construction with a pronged sheetmetal anchor. Wall tie is distinguished over that of Schwalberg '990 and is clipped onto a straight wire run.

U.S. Pat. No. 5,392,581—Hatzinikolas et al.—Issued Feb. 28, 1995 discloses a cavity-wall anchor having a conventional tie wire for mounting in the brick veneer and an L-shaped sheetmetal bracket for mounting vertically between side-by-side blocks and horizontally atop a course of blocks. The bracket has a slit which is vertically disposed and protrudes into the cavity. The slit provides for a vertically adjustable anchor.

U.S. Pat. No. 5,408,798—Hohmann—Issued Apr. 25, 1995 discloses a seismic construction system for a cavity wall having a masonry anchor, a wall tie, and a facing anchor. Sealed eye wires extend into the cavity and wire wall ties are threaded therethrough with the open ends thereof embedded with a Hohmann '319 (see supra) clip in the mortar layer of the brick veneer.

U.S. Pat. No. 5,456,052—Anderson et al.—Issued Oct. 10, 1995 discloses a two-part masonry brick tie, the first part being designed to be installed in the inner wythe and then, later when the brick veneer is erected to be interconnected by the second part. Both parts are constructed from sheetmetal and are arranged on substantially the same horizontal plane.

U.S. Pat. No. 5,816,008—Hohmann—Issued Oct. 15, 1998 discloses a brick veneer anchor primarily for use with a cavity wall with a drywall inner wythe. The device combines an L-shaped plate for mounting on the metal stud of the drywall and extending into the cavity with a T-head bent stay. After interengagement with the L-shaped plate the free end of the bent stay is embedded in the corresponding bed joint of the veneer.

U.S. Pat. No. 6,209,281—Rice—Issued Apr. 3, 2001 discloses a masonry anchor having a conventional tie wire for mounting in the brick veneer and sheetmetal bracket for mounting on the metal-stud-supported drywall. The bracket has a slit which is vertically disposed when the bracket is mounted on the metal stud and, in application, protrudes through the drywall into the cavity. The slit provides for a vertically adjustable anchor.

U.S. Pat. No. 6,279,283—Hohmann et al.—Issued Aug. 28, 2001 discloses a low-profile wall tie primarily for use in renovation construction where in order to match existing mortar height in the facing wythe a compressed wall tie is embedded in the bed joint of the brick veneer.

None of the above provide the high-strength, supported stud-type wall anchor or anchoring systems utilizing these devices of this invention. As will become clear in reviewing the disclosure which follows, the insulated cavity wall structures benefit from the recent developments described herein that lead to solving the problems of insulation and air/vapor barrier integrity, of high-span applications, and of pin-point loading. The wall anchors, when combined with various veneer tie arrangements hereof, provide for angular adjustment therebetween, self-leveling installation, and seismic level of protection.

SUMMARY

In general terms, the invention disclosed hereby is an anchoring system for use in an insulated cavity wall. The anchoring system has a steel stud-type wall anchor and a wire formative veneer tie. The steel stud has an elongated dual-diameter barrel body with a driven self-drilling tip.

At the juncture of the smaller diameter barrel and the larger diameter barrel, there is a flange that houses an interior seal. At the juncture of the larger diameter barrel and the driver head, there is a flange that houses an exterior seal. The wall anchor is dimensioned with the length of the smaller diameter barrel (less the height of the interior seal) to be coextensive with the drywall and the air/vapor barrier. Additionally, the wall anchor is dimensioned with the length of the larger diameter barrel (plus the height of the interior seal) to be coextensive with the rigid insulation.

The structure taught by this invention overcomes both the problems of pin-point loading and of insulation integrity described in the Background of the Invention hereinabove. The pin-point loading is overcome by full body support throughout the drywall, the air/vapor barrier, and the insulation. The interior seal, when the stud-type anchor is fully driven into place provides a seal over the insertion point into the air/vapor barrier. Similarly, the exterior seal, when the stud-type anchor is fully driven into place, provides a seal over the opening of an anchor-receiving channel and thereby preserves the insulation integrity. The interior seal and the larger barrel of the anchor, when installed, completely fill the anchor receiving channel and stabilize the wall anchor. The wall anchor is clamped in place by the interior and exterior seals.

The stud-type anchor is disclosed as operating with a variety of veneer ties each providing for different applications. A modified Byna-Tie® wire formative with a swaged side leg in the insertion portion expands the utility of the system to seismic applications and accommodates a wire reinforcement in the outer wythe. A tie with a U-shaped rear leg provides for accommodating the driver head at whatever angle it is at when fully driven into place. A tie with an angled rear leg provides for self-leveling as between the stud position and the bed joint height.

Objects and Features of the Invention

Accordingly, it is the primary object of the present invention to provide new and novel anchoring systems for insulated cavity walls, which systems provide high-strength connectivity with two seals—one for the insulation; and the other for the air/vapor barrier.

It is another object of the present invention to prevent air infiltration and water penetration into and along the wall anchoring channel.

It is yet another object of the present invention to provide adjustability of the veneer anchor to compensate for slight angular and height misalignments.

It is still yet another object of the present invention to provide an anchoring system which fully supports the wall anchor along the length thereof and precludes pin-point loading and prevents disengagement under seismic and other severe environmental conditions.

It is a feature of the present invention that the wall anchor has a dual-diameter barrel with a self-drilling screw tip which facilitates installation.

It is another feature of the present invention that the wall anchor is convertible with an apertured collar adapter to receive a box tie veneer anchor.

It is yet another feature of the present invention that the anchor system is angularly adjustable with veneer anchor having a U-shaped rear leg.

It is still yet another feature of the present invention that the anchoring system is self-leveling with an infinity shaped veneer anchor.

In the following drawing, the same parts in the various views are afforded the same reference designators.

DESCRIPTION OF THE PREFERRED EMBODIMENTS

Before entering into the detailed Description of the Preferred Embodiments, several terms which will be revisited later are defined. These terms are relevant to discussions of innovations introduced by the improvements of this disclosure that overcome the deficits of the prior art devices.

In the embodiments described hereinbelow, the inner wythe is provided with insulation. In dry wall construction, this takes the form of exterior insulation disposed on the outer surface of the inner wythe. In the masonry block backup wall construction, insulation is applied to the outer surface of the masonry block. Recently, building codes have required that after the anchoring system is installed and, prior to the inner wythe being closed up, that an inspection be made for insulation integrity to ensure that the insulation prevents infiltration of air and moisture. Here the term insulation integrity is used in the same sense as the building code in that, after the installation of the anchoring system, there is no change or interference with the insulative properties and concomitantly substantially no change in the air and moisture infiltration characteristics.

Anchoring systems for cavity walls are used to secure veneer facings to a building and overcome seismic and other forces, i.e. wind shear, etc. In the past some systems have experienced failure because the forces have been concentrated at substantially a single point. Here, the term pin-point loading refers to an anchoring system wherein forces are concentrated at a single point. In the Description which follows, means for supporting the wall anchor shaft to limit lateral movement are taught.

In addition to that which occurs at the facing wythe, attention is further drawn to the construction at the exterior surface of the inner or backup wythe. Here there are two concerns, namely, maximizing the strength and ease of the securement of the wall anchor to the backup wall while, as previously discussed, maintaining the integrity of the insulation. The first concern is addressed using appropriate fasteners such as for mounting to metal, drywall studs, self-drilling screws. The latter concern is addressed by the wall anchor seal which surround the openings formed for the installation (the profile is seen in the cross-sectional drawing FIG. 2)

In the detailed description, the veneer reinforcements and the veneer anchors are wire formatives, the wire used in the fabrication of veneer joint reinforcement conforms to the requirements of ASTM Standard Specification A951-00, Table 1. For the purpose of this application tensile strength tests and yield test of veneer joint reinforcements are, were applicable, those denominated in ASTM-A951-00 Standard Specification for Masonry Joint Reinforcement.

Figure 1:
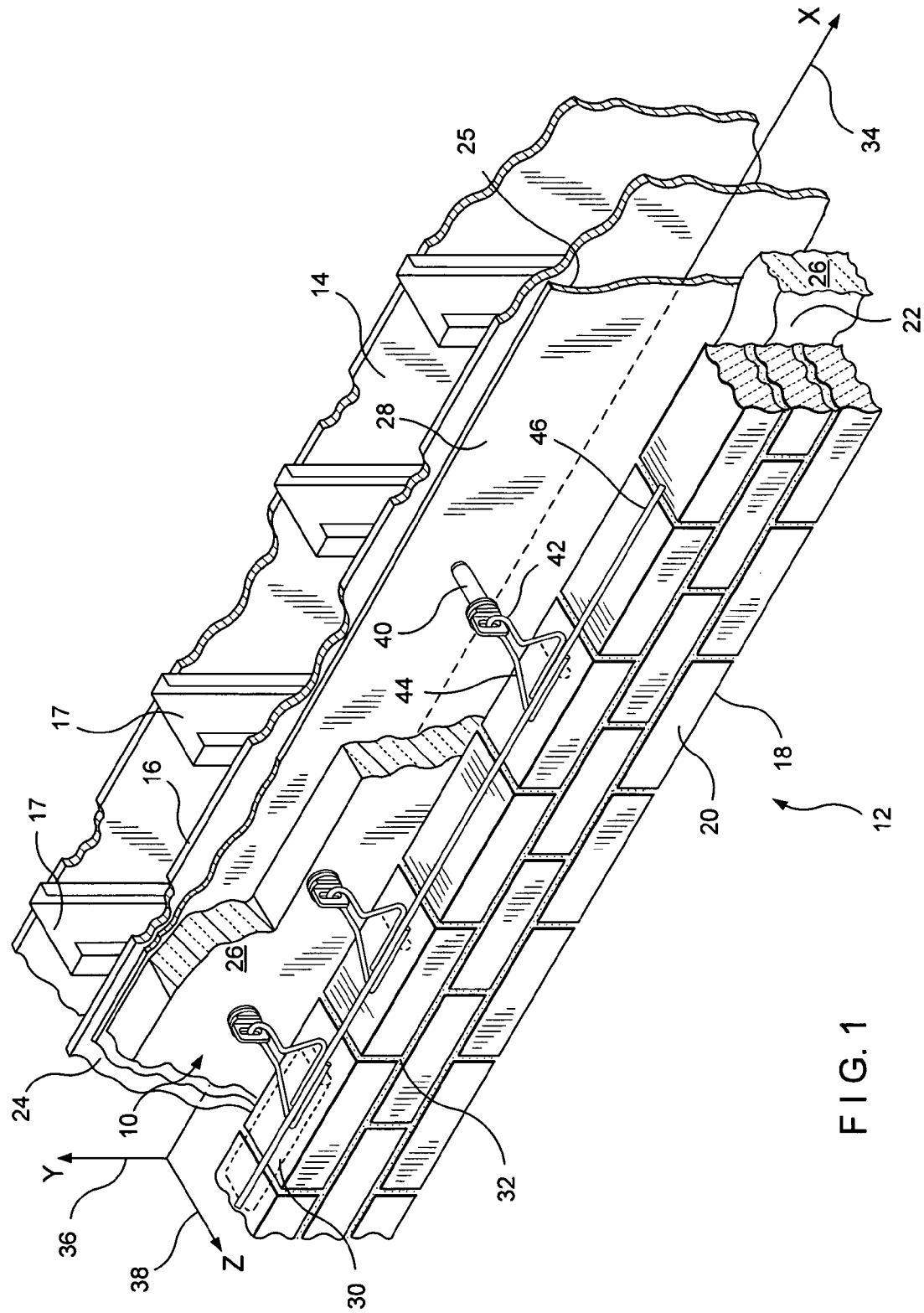
FIG. 1 shows a first embodiment of this invention and is a perspective view of an anchoring system as applied to a cavity wall with an inner wythe of an insulated dry wall construction and an outer wythe of brick.

Referring now to FIGS. 1 though 3, the first embodiment shows an anchoring system suitable for seismic zone applications. This anchoring system, discussed in detail hereinbelow, has a wall anchor, an interengaging veneer tie, and a veneer (outer wythe) reinforcement and is disposed in an externally insulated drywall. For the first embodiment, a cavity wall having an insulative layer of 4.0 inches (approx.) and a total span of 4.75 inches (approx.) is chosen as exemplary.

The anchoring system for cavity walls is referred to generally by the numeral 10. A cavity wall structure 12 is shown having an inner wythe or drywall backup 14 with sheetrock or wallboard 16 mounted on metal studs or columns 17 and an outer wythe or facing wall 18 of brick 20 construction. Between the inner wythe 14 and the outer wythe 18, a cavity 22 is formed. The cavity 22 has attached to the exterior surface 24 of the inner wythe 14 an air/vapor barrier 25 and insulation 26.

The air/vapor barrier 25 and the wallboard 16 together form the exterior layer 28 of the inner wythe 14, which exterior layer 28 has the insulation 26 disposed thereon.

Successive bed joints 30 and 32 are substantially planar and horizontally disposed and, in accord with building standards, are 0.375-inch (approx.) in height. Selective ones of bed joints 30 and 32, which are formed between courses of bricks 20, are constructed to receive therewithin the insertion portion of the veneer anchor hereof. Being threadedly mounted in the inner wythe, the wall anchor is supported thereby and, as described in greater detail herein below, is configured to minimize air and moisture penetration around the wall anchor/inner wythe interface.

For purposes of discussion, the cavity surface 24 of the inner wythe 14 contains a horizontal line or x-axis 34 and intersecting vertical line or y-axis 36. A horizontal line or z-axis 38, normal to the xy-plane, passes through the coordinate origin formed by the intersecting x- and y-axes. A wall anchor 40 is shown with a U-shaped rear leg portion 42. The wall anchor 40, while shown as a unitary structure of high-strength steel may be manufactured as an assemblage of several distinct parts.

The veneer tie 44 is adapted from one shown and described in Hohmann, U.S. Pat. No. 4,875,319 which patent is incorporated herein by reference. The veneer tie 44 is shown in FIG. 1 as being emplaced on a course of bricks 20 in preparation for embedment in the mortar of bed joint 30. In this embodiment, the system includes a wire or outer wythe reinforcement 46, a wall anchor 40 and a veneer tie 44. The wire reinforcement 46 is constructed of a wire formative conforming to the joint reinforcement requirements of ASTM Standard Specification A951-00, Table 1, see supra.

Figure 2:
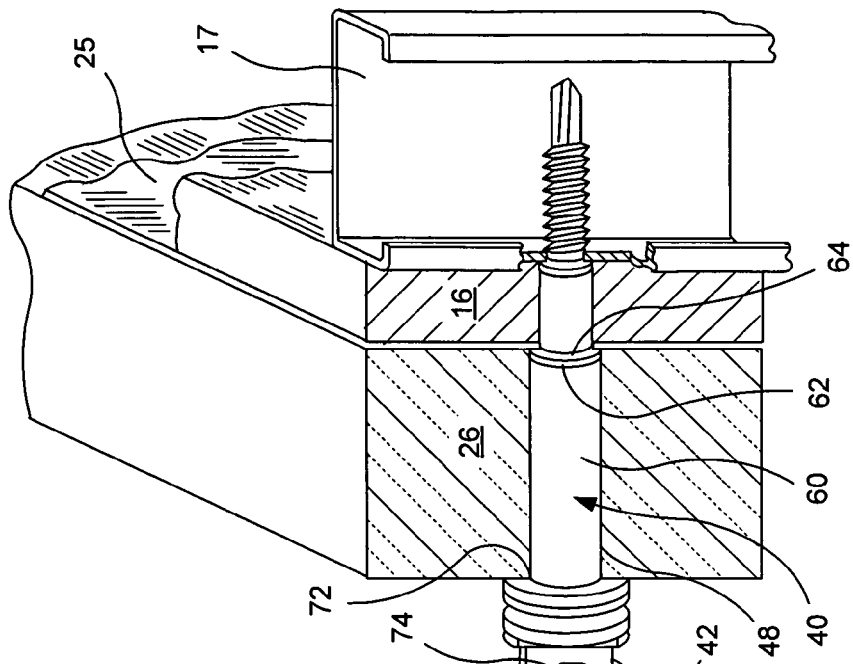
FIG. 2 is a partial perspective view of FIG. 1 which shows the double sealing of the wall anchor, a wire reinforcement for seismic protection, and the angular adjustability of the veneer anchor.
Figure 3:
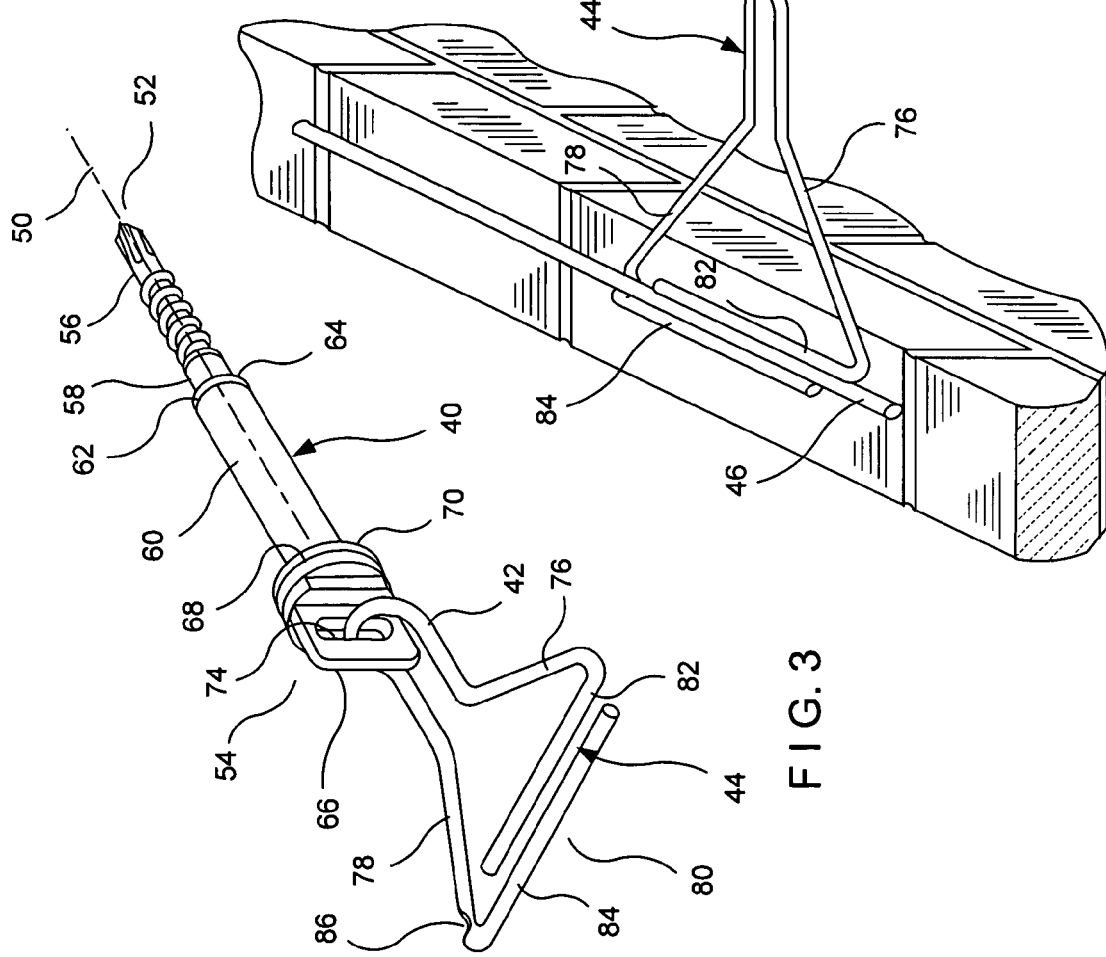
FIG. 3 is a perspective view of the wall anchor of FIG. 1 showing the dual-barrel configuration, the insulation seal, the air/vapor barrier seal, and the sel-drilling screw.

At intervals along a horizontal surface 24, wall anchors 40 are driven into place in the anchor-receiving channels 48. The wall anchors 40 are positioned on surface 24 so that the longitudinal axis 50 of wall anchor 40 is normal to an xy-plane and taps into column 17. As best shown in FIGS. 2 and 3, the wall anchor 40 extends from a driven end 52 to a driver end 54. The driven end 52 is constructed with a self-drilling screw portion 56.

Contiguous with screw portion 56 is a dual-diameter barrel with a smaller diameter barrel or shaft portion 58 toward the driven end 52 and a larger diameter barrel or shaft portion 60 toward the driver end 54. At the juncture of barrel portions 58 and 60, a flange 62 is formed and a stabilizing neoprene fitting or internal seal 64 is emplaced thereat. When fully driven into column 17 the screw 56 and barrel portion 58 of wall anchor 40 pierces sheetrock or wallboard 16 and air/vapor barrier 25. The seal 64 covers the insertion point precluding air and moisture penetration therethrough and maintaining the integrity of barrier 25.

At the driving end 54, a driver portion 66 adjoins larger diameter barrel or shaft portion 60 forming a flange 68 therebetween and another stabilizing neoprene fitting or external seal 70 is emplaced thereat. Upon installation into rigid insulation, the larger barrel portion 60 is forced into a press fit relationship with anchor-receiving channel 48. Stabilization of this stud-type wall anchor 40 is attained by barrel portion 60 and internal neoprene fitting 64 completely filling the channel 48 with external neoprene fitting 70 capping the opening 72 of channel 48 into cavity 22 and clamping wall anchor 40 in place. This arrangement does not leave any wiggle room for pin-point loading of the wall anchor. With stabilizing fitting or external seal 70 in place, the insulation integrity within the cavity wall is maintained.

In producing wall anchor 48, the length of the smaller diameter barrel 58 less the internal seal 64 height is selected to match the external layer 28 thickness. Similarly, the length of the larger diameter barrel 60 plus the internal seal 64 height is selected to match the insulation thickness.

In this embodiment, the driver portion 66 has an elongated aperture 74 for the interlacing of veneer tie 44. The veneer tie 44 is a wire formative having a U-shaped rear leg portion 42 for angular adjustment, see supra. From the rear leg 42, two side legs 76 and 78 extend to and, at the front portion thereof, are part of insertion portion 80 which is shown installed into bed joint 30. The insertion portion 80 is constructed with two parallel front legs 82 and 84 adjoining side legs 76 and 78, respectively, and housing therebetween wire reinforcement 46. At the juncture of side leg 78 and front leg 84, a swaged area 86 is shown for further accommodating wire reinforcement 46.

Figure 4:
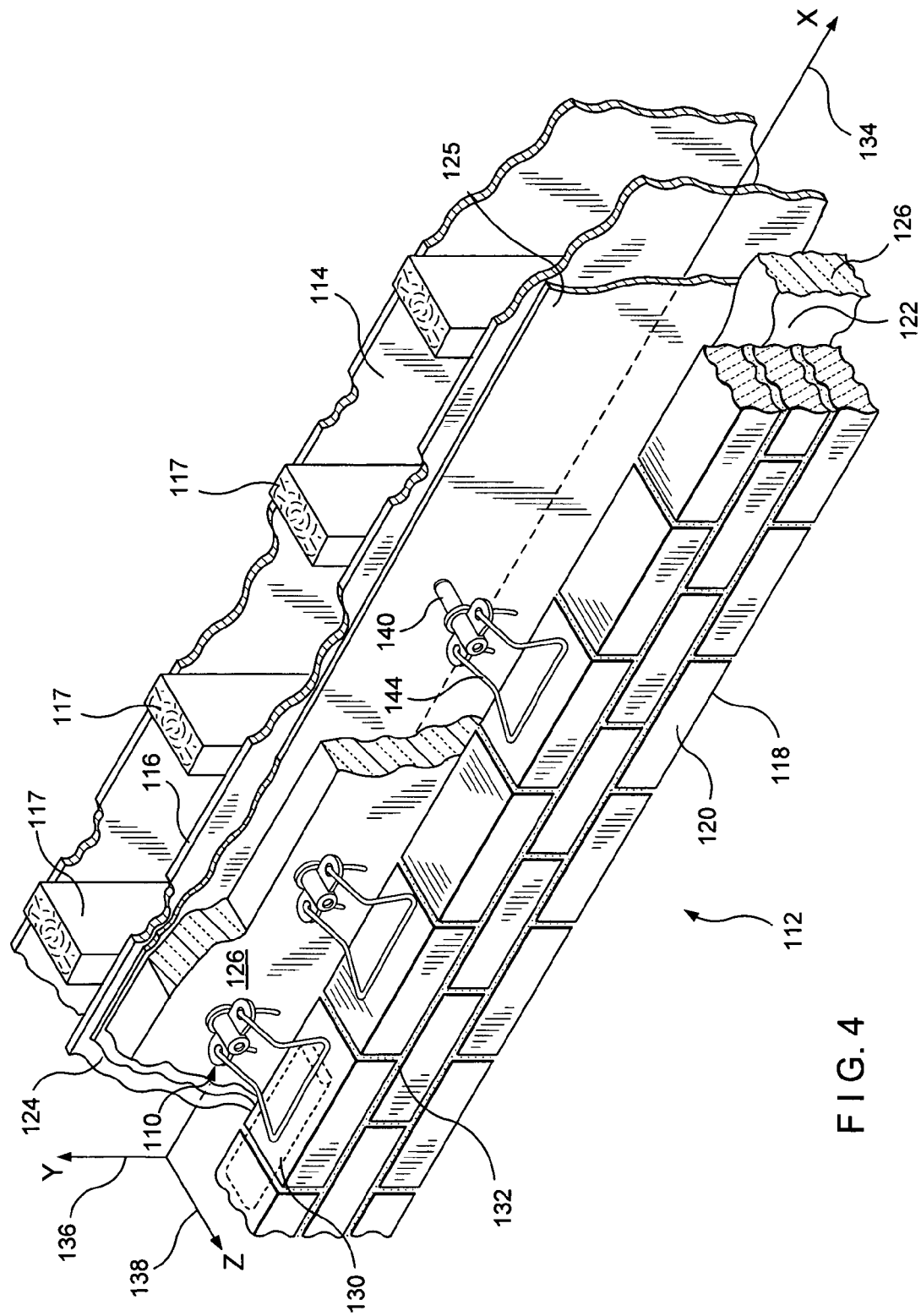
FIG. 4 is a second embodiment of this invention and is a perspective view of an anchoring system similar to FIG. 1, but showing a slip-in collar with box-tie veneer anchor and an inner wythe of wood framing.
Figure 5:
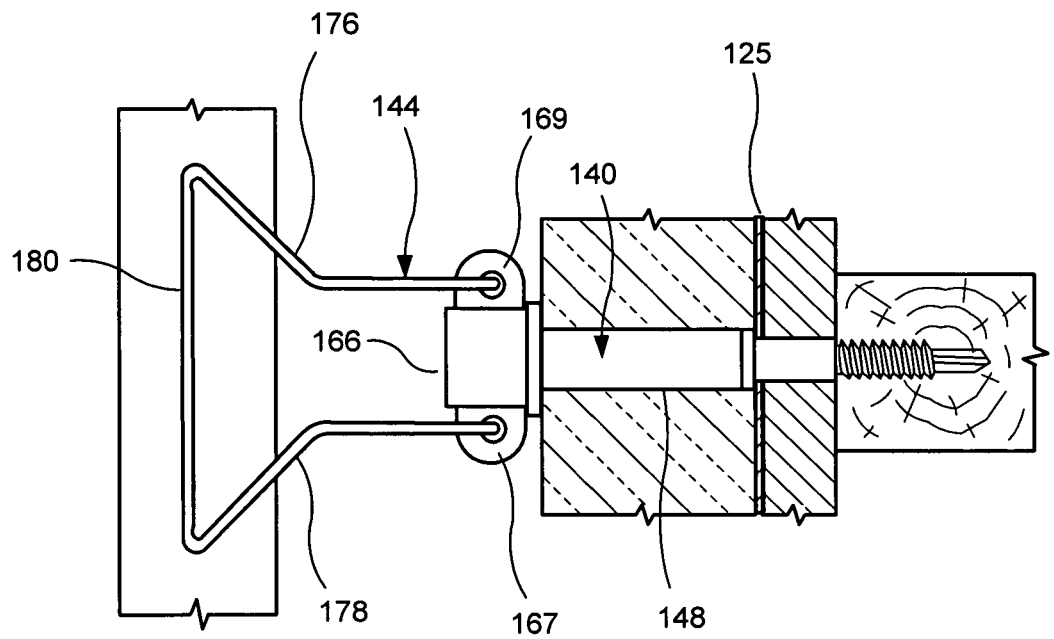
FIG. 5 is a cross-sectional view of FIG. 4 taken along an xz-plane including the longitudinal axis of the wall anchor.
Figure 6:
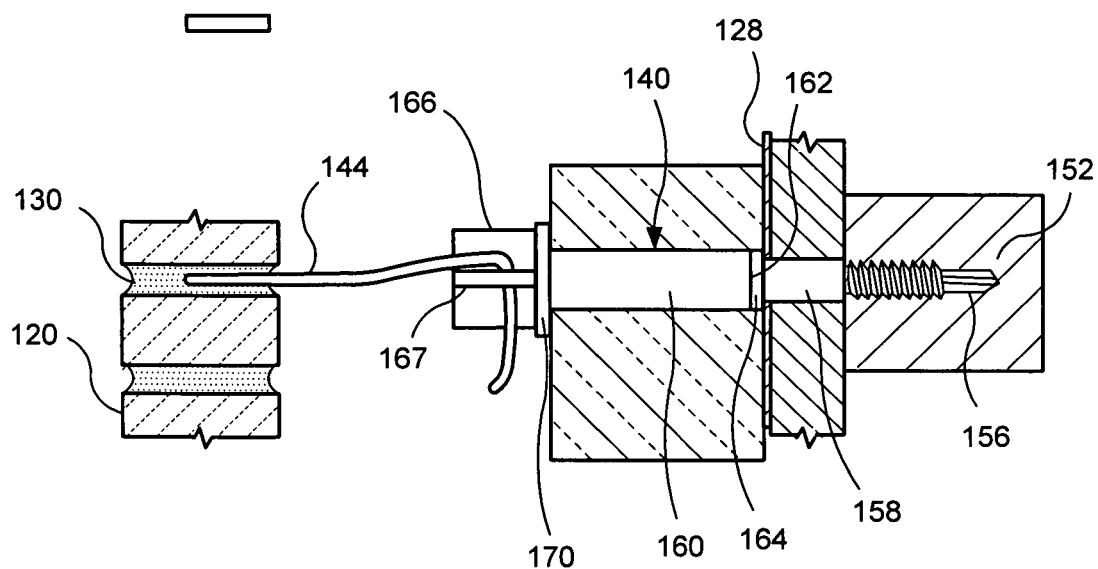
FIG. 6 is a cross-sectional view of FIG. 4 taken along an yz-plane including the longitudinal axis of the wall anchor.
Figure 7:
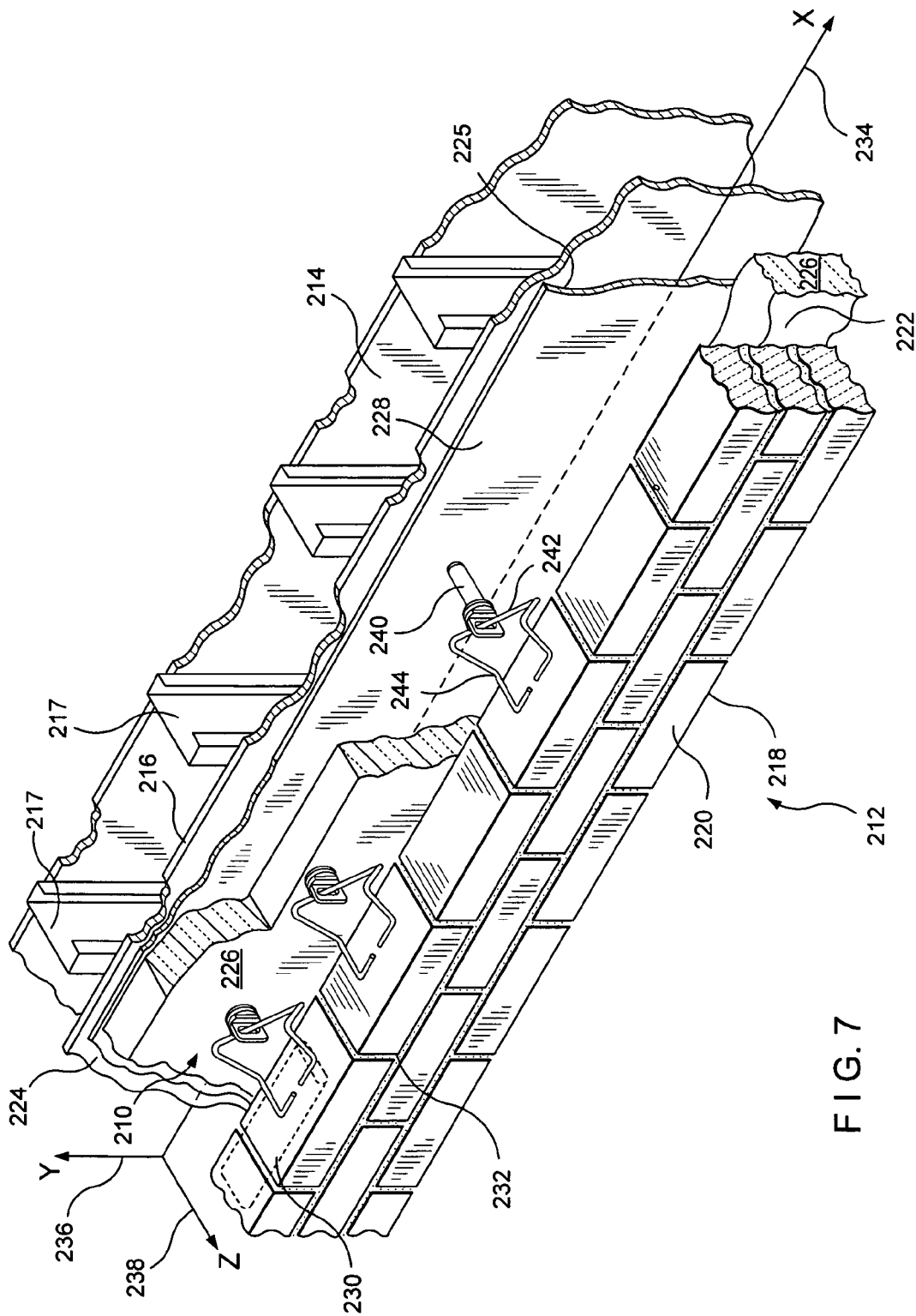
FIG. 7 is a third embodiment of this invention and is a perspective view of an anchoring system similar to FIG. 1, but showing a self-leveling veneer anchor and an inner wythe of poured concrete.

The description which follows is a second embodiment of the anchoring system for insulated cavity walls of this invention. For ease of comprehension, wherever possible similar parts use reference designators 100 units higher than those above. Thus, the veneer tie 144 of the second embodiment is analogous to the veneer tie 44 of the first embodiment. Referring now to FIGS. 4, 5 and 6, the second embodiment of the anchoring system is shown and is referred to generally by the numeral 110. As in the first embodiment, a wall structure 112 is shown. The second embodiment has an inner wythe or backup wall 114 of a drywall or a wallboard construct 116 on wood framing or studs 117 and an outer wythe or veneer 118 of brick 120. Here, the anchoring system has a wall anchor with a clip-on, winged collar for receiving the veneer tie portion of the anchoring system.

For purposes of discussion, the cavity surface 124 of the inner wythe 114 contains a horizontal line or x-axis 134 and an intersecting vertical line or y-axis 136. A horizontal line or z-axis 138, normal to the xy-plane, passes through the coordinate origin formed by the intersecting x- and y-axes. A wall anchor construct 140 is shown which penetrates the wallboard 116. The wall anchor 140 is a unitary metal construct which is constructed for mounting in inner wythe 114 and for interconnection with veneer tie 144.

The veneer tie 144 is a box Byna-Tie® device manufactured by Hohmann & Barnard, Inc., Hauppauge, N.Y. 11788. The veneer tie 144 is shown in FIG. 4 as being emplaced on a course of bricks 120 in preparation for embedment in the mortar bed joint 130. In this embodiment, the system includes a wall anchor 140 and a veneer tie 144.

But for the structure of the driver portion 166, the wall anchor 140 is like wall anchor 40 just described. Here, the driven end 152 is again a self-drilling screw portion 156 with a first and a second shaft portion 158 and 160, respectively, of increasing diameter. The internal seal 164 and external seal 170 are at flanges 162 and 168. The driver portion 166 is capable of being driven using a conventional chuck and, after being rotated to align with the bed joint 130, collar 167 is locked in place. The collar 167, which has two apertures 169 for accommodating the veneer tie, has the effect of spreading stresses experienced during use and further reducing pinpoint loading as opposite force vectors cancel one another.

The description which follows is a third embodiment of the anchoring system for insulated cavity walls of this invention. For ease of comprehension, wherever possible similar parts use reference designators 200 units higher than those in the first embodiment. Referring now to FIGS. 7 through 10, the third embodiment is shown and referred to generally by the numeral 210.

A cavity wall structure 212 is shown having an inner wythe or masonry block backup 214 and an outer wythe or facing wall 218 of brick 222 is formed. The cavity 222 has attached to the exterior surface 224 of the inner wythe 214 an air/vapor barrier 225 and insulation 226.

Successive bed joints 230 and 232 are substantially planar and horizontally disposed and in, accord with building standards, are 0.375-inch (approx.) in height. Selective ones of bed joints 230 and 232, which are formed between courses of bricks 220, are constructed to received therewithin the insertion portion of the veneer anchor hereof. Being threadedly mounted in the inner wythe, the wall anchor is supported thereby and, as described in greater detail hereinbelow, is configured to minimize air and moisture penetration around the wall anchor/inner wythe interface.

Figure 8:
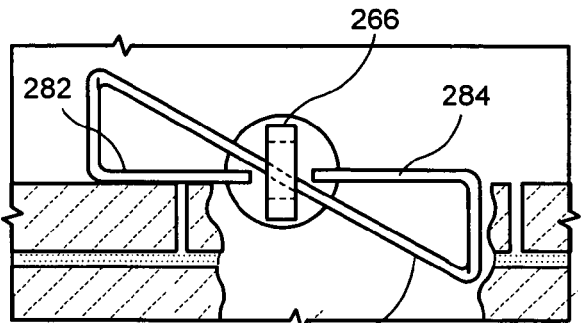
FIG. 8 shows a perspective view of a detail of FIG. 7 that includes the wall anchor and the self-leveling veneer anchor.
Figure 9:
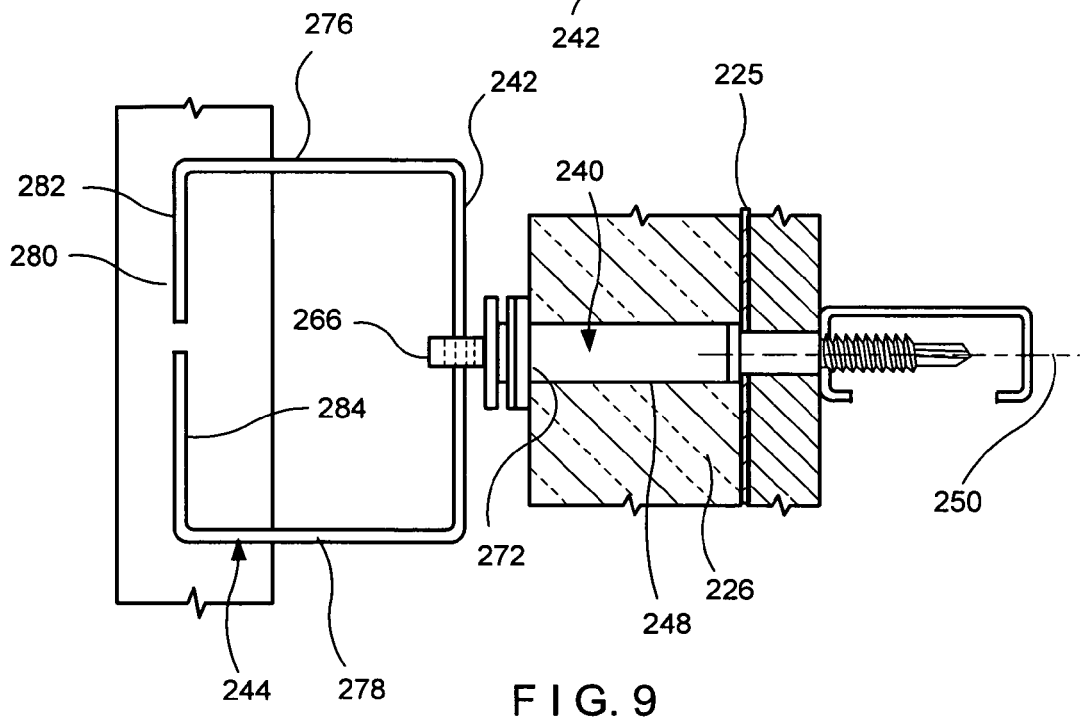
FIG. 9 is a cross sectional view of FIG. 7 taken along an xz-plane including the longitudinal axis of the wall anchor; and, FIG. 10 is a cross-sectional view of FIG. 7 taken along a yz-plane including the longitudinal axis of the wall anchor.
Figure 10:
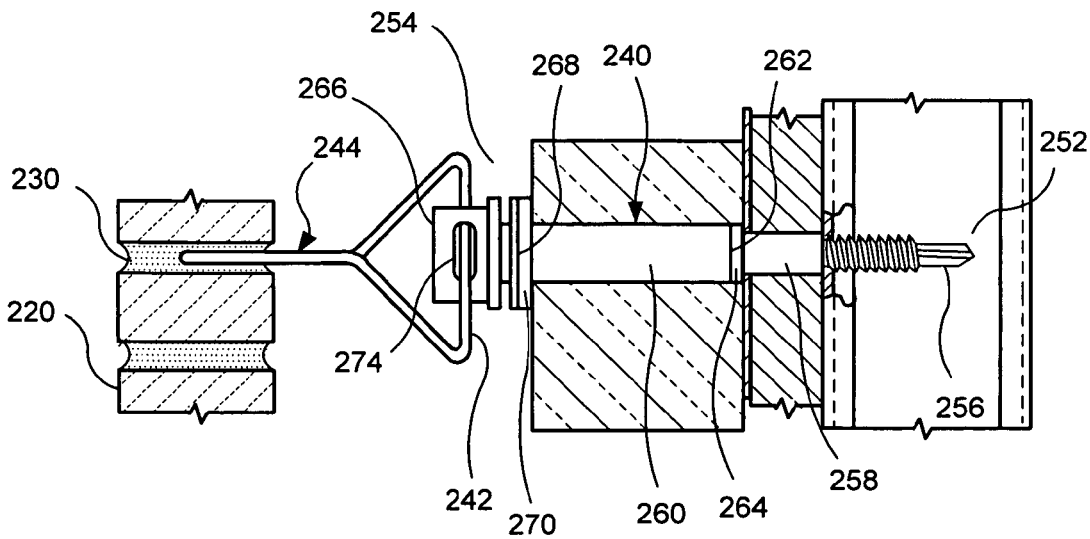

The veneer tie 244 is a self-leveling tie and corrects slight misalignment between wall anchor and bed joint levels. The veneer tie 244 is shown in FIGS. 8, 9 and 10 as being emplaced on a course of bricks 220 in preparation for embedment in the mortar of bed joint 230. As shown in this embodiment, the system does not include a wire or outer wythe reinforcement (46, FIG. 1), but could easily be modified to incorporate the same.

At intervals along a horizontal surface 224, wall anchors 240 are driven into place in the anchor-receiving channels 248. The wall anchors 240 are positioned on surface 224 so that the longitudinal axis 250 of wall anchor 240 is normal and taps into masonry backup wall 214. As best shown in FIGS. 9 and 10, the wall anchor 240 extends from a driven end 252 to a driver end 254. The driven end 252 is constructed with a self-drilling screw portion 256.

Contiguous with screw portion 256 is a dual-diameter barrel with a smaller diameter barrel or shaft portion 258 toward the driven end 252 and a larger diameter barrel or shaft portion 260 toward the driver end 254. At the juncture of barrel portions 258 and 260, a flange 262 is formed and a stabilizing neoprene fitting or internal seal 264 is emplaced thereat. When fully driven into masonry inner wythe 214, the internal seal 264 and barrel portion 260 of wall anchor 240 are drawn into the insulation 226. Further the seal 264 abuts the insertion point precluding air and moisture penetration thereinto.

At the driving end 254, a driver portion 266 adjoins larger diameter barrel or shaft portion 260 forming a flange 268 therebetween and another stabilizing neoprene fitting or external seal 270 is emplaced thereat. Upon installation into rigid insulation, the larger barrel portion 260 is forced into a press fit relationship with anchor-receiving channel 248. Stabilization of this stud-type wall anchor 240 is attained by barrel portion 260 and internal neoprene fitting 264 completely filling the channel 248 with external neoprene fitting 270 capping the opening 272 of channel 248 into cavity 222 and clamping wall anchor 240 in place. With stabilizing fitting or external seal 270 in place, the insulation integrity within the cavity wall is maintained.

Here, the veneer tie 244 is a wire formative having a rear leg 242 set at an angle to the front legs. In this embodiment, the driver portion 266 has an elongated aperture 274 for the interlacing of veneer tie 244. From the rear leg 242, two side legs 276 and 278 extend to and, at the front portion thereof, are part of insertion portion 280. Because of the angular displacement, one of the side legs extends upwardly to the insertion portion; and the other, downwardly. The insertion portion 280 is constructed with two front legs 282 and 284 adjoining side legs 276 and 278, respectively. The veneer tie 244 is self-leveling as, upon insertion into bed joint 230, the position along rear leg 242 of aperture 274 is established.

In the above description of anchoring systems for insulated cavity walls of this invention various configurations are described and applications thereof in corresponding settings are provided. Because varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense. Thus minor changes may be made without departing from the spirit of the invention.

What is claimed is:

1. An anchoring system for use in an insulated cavity wall having an inner wythe and an outer wythe with a cavity therebetween, said outer wythe formed from a plurality of successive courses with a bed joint between each two adjacent courses, said inner wythe having an exterior layer with an air/vapor barrier and rigid insulation disposed thereon and having an anchor-receiving channel therethrough, extending from said exterior layer and opening onto said cavity, said anchoring system comprising, in combination:

a wall anchor having an elongated body extending along a longitudinal axis from a driven end to a driving end, said wall anchor, in turn comprising:

a threaded portion at said driven end of said elongated body;

a first shaft portion of a predetermined length contiguous and integral with said threaded portion and extending therefrom toward said driving end;

a second shaft portion dimensioned with a diameter for a press fit relationship with said anchor-receiving channel, said second shaft portion contiguous and integral with said first shaft portion and extending therefrom toward said driving end, said second shaft portion having a substantially larger diameter and forming a first flange therebetween;

a driver portion at said driving end contiguous and integral with said second shaft portion and forming a second flange therebetween;

an internal stabilizer disposed on said wall anchor at said first flange limiting lateral displacement of said wall anchor, said internal stabilizer being a stabilizing neoprene fitting compressed upon said wall anchor being fully driven into said anchor-receiving channel sealing said anchor-receiving channel at the insertion point of said wall anchor through said air/vapor barrier, said internal stabilizer at said first flange and said second shaft portion having a combined length along said longitudinal axis dimensioned to be coextensive with said anchor-receiving channel;

an external stabilizer disposed on said wall anchor at said second flange limiting lateral displacement of said wall anchor, said external stabilizer being a stabilizing neoprene fitting compressed upon said wall anchor being fully driven into said anchor-receiving channel sealing said opening of said anchor-receiving channel precluding water and vapor penetration therethrough; and, a veneer tie in an interlacing relationship with said wall anchor, said veneer tie having an insertion portion adapted for embedment in said bed joint of said outer wythe;

whereby pin-point loading is overcome thereby.

2. An anchoring system as described in claim 1 wherein said driver portion further comprises an elongated aperture therethrough for receiving said veneer tie.

3. An anchoring system as described in claim 2 wherein said veneer tie has an insertion portion adapted for disposition in said bed joint of said outer wythe, said insertion portion having a swaged side leg.

4. An anchoring system as described in claim 3 further comprising a reinforcement wire disposed in said swaged side leg of said veneer tie and adapted for disposition in said bed joint of said outer wythe.

5. An anchoring system as described in claim 2 wherein said veneer tie has a U-shaped rear leg for insertion in said elongated aperture of said driver portion.

6. An anchoring system as described in claim 5 wherein said veneer tie has an insertion portion adapted for disposition in said bed joint of said outer wythe, said insertion portion having a swaged side leg.

7. An anchoring system as described in claim 6 further comprising a reinforcement wire disposed in said swaged side leg of said veneer tie and adapted for disposition in said bed joint of said outer wythe.

8. An anchoring system for use in an insulated cavity wall having an inner wythe and an outer wythe with a cavity therebetween, said outer wythe formed from a plurality of successive courses with a bed joint between each two adjacent courses, said inner wythe having an exterior layer with drywall, an air/vapor barrier and insulation disposed thereon, said anchoring system comprising, in combination:

a wall anchor having an elongated body extending along a longitudinal axis from a driven end to a driving end, said wall anchor, in turn, comprising:

a self-chilling threaded portion at said driven end of said elongated body;

a first shaft portion dimensioned to be that of the combined thickness of said drywall and said air/vapor barrier, said first shaft portion contiguous and integral with said threaded portion and extending therefrom toward said driving end;

a second shaft portion contiguous and integral with said first shaft portion and extending therefrom toward said driving end, said second shaft portion having a substantially larger diameter forming a first flange therebetween;

a driver portion at said driving end contiguous and integral with said second shaft portion and forming a second flange therebetween said driver portion forming a channel for said anchor in said insulation, said channel extending from said exterior layer and opening onto said cavity, and whereby said second shaft portion is driven into a press fit relationship with said channel limiting the lateral displacement thereof;

an internal seal disposed on said wall anchor at said first flange, said internal seal at said first flange and said second shaft portion having a combined length along said longitudinal axis to be coextensive with said channel in said insulation, said internal seal being a stabilizing neoprene fitting compressed upon said wall anchor being fully driven into said channel;

an external seal disposed on said wall anchor at said second flange, said external seal being a neoprene fitting compressed upon said wall anchor being fully driven into said channel; and, a veneer tie in an interlacing relationship with said wall anchor, said veneer tie having an insertion portion adapted for embedment in said bed joint of said outer wythe;

whereby pin-point loading is overcome thereby.

9. An anchoring system for use in an insulated cavity wall having an inner wythe and an outer wythe with a cavity therebetween, said outer wythe formed from a plurality of successive courses with a bed joint between each two adjacent courses, said inner wythe having an exterior layer with an air/vapor barrier and rigid insulation disposed thereon, said anchoring system comprising, in combination:

a wall anchor having an elongated body extending along a longitudinal axis from a driven end to a driving end, said elongated body having a dual diameter with a first diameter and a second diameter, said wall anchor, in turn, comprising:

a threaded portion at said driven end of said elongated body;

a first shaft portion of said first diameter contiguous and integral with said threaded portion and extending therefrom toward said driving end;

a second shaft of said second diameter portion contiguous and integral with said first shaft portion and extending therefrom toward said driving end, forming a first flange between said first shaft portion and said second shaft portion;

a driver portion at said driving end contiguous and integral with said second shaft portion and fanning a second flange therebetween, said driver portion during installation boring an anchor-receiving channel in said rigid insulation;

said second shaft portion, upon installation, being drawn into a press-fit relationship with said anchor-receiving channel;

an external seal disposed at said second flange sealing said opening of said anchor-receiving channel, said external seal being a stabilizing neoprene fitting; and an internal seal sealing said anchor-receiving channel at the insertion point of said wall anchor through said air/vapor barrier, said internal seal being a stabilizing neoprene fitting;

a veneer tie in an interlacing relationship with said wall anchor, said veneer tie having an insertion portion adapted for embedment in said bed joint of said outer wythe, said veneer tie has an insertion point adapted for disposition in said bed joint of said outer wythe, said insertion portion having a swaged side leg.

10. An anchoring system as described in claim 9 further comprising:

a reinforcement wire disposed in said swaged side leg of said veneer tie and adapted for disposition in said bed joint of said outer wythe.

* * * * *